(12) United States Patent
Deivasigamani et al.

(10) Patent No.: US 12,381,511 B2
(45) Date of Patent: Aug. 5, 2025

(54) HEATING SYSTEM INCLUDING PHOTOVOLTAIC THERMAL SYSTEM

(71) Applicant: Intellihot, Inc., Galesburg, IL (US)

(72) Inventors: Sridhar Deivasigamani, Mundelein, IL (US); Sivaprasad Akasam, Round Rock, TX (US)

(73) Assignee: Intellihot, Inc., Galesburg, IL (US)

( * ) Notice: Subject to any disclaimer, the term of this patent is extended or adjusted under 35 U.S.C. 154(b) by 175 days.

(21) Appl. No.: 18/221,547

(22) Filed: Jul. 13, 2023

(65) Prior Publication Data

US 2024/0305244 A1    Sep. 12, 2024

Related U.S. Application Data

(63) Continuation-in-part of application No. 18/119,344, filed on Mar. 9, 2023, now Pat. No. 11,973,463.

(51) Int. Cl.
| | |
|---|---|
| *H02S 40/44* | (2014.01) |
| *H02S 40/32* | (2014.01) |
| *H02S 40/38* | (2014.01) |
| *H02S 20/30* | (2014.01) |

(52) U.S. Cl.
CPC .............. *H02S 40/44* (2014.12); *H02S 40/32* (2014.12); *H02S 40/38* (2014.12); *H02S 20/30* (2014.12)

(58) Field of Classification Search
CPC .......... H02S 40/44; H02S 40/32; H02S 40/38; H02S 20/30; F24D 2200/123; F24D 2220/08; F24D 18/00; F24D 2101/40; F24D 2200/02; F24S 2020/17; F24S 10/00

See application file for complete search history.

(56) References Cited

U.S. PATENT DOCUMENTS

| | | | | |
|---|---|---|---|---|
| 2,575,478 A | * | 11/1951 | Wilson | F24S 10/00 126/643 |
| 2016/0146507 A1 | * | 5/2016 | Johnson | F24S 50/20 126/714 |
| 2018/0006464 A1 | * | 1/2018 | Judkins | H02S 40/32 |
| 2022/0136711 A1 | * | 5/2022 | Leckinger | F24D 19/1063 62/235.1 |

* cited by examiner

*Primary Examiner* — Michael Y Sun
(74) *Attorney, Agent, or Firm* — Jong Patent Firm; Cheng Ning Jong; Tracy P. Jong

(57) ABSTRACT

A heating system includes a thermal battery, a heat pump configured to store heat in the thermal battery, a photovoltaic thermal system including a solar electric generator and a solar thermal generator, wherein the solar thermal generator is configured to store heat in the thermal battery and the solar electric generator is configured to generate electrical charge and a housing within which the thermal battery and the heat pump are disposed and atop which the photovoltaic thermal system is disposed.

6 Claims, 10 Drawing Sheets

HEATING SYSTEM INCLUDING PHOTOVOLTAIC THERMAL SYSTEM

PRIORITY CLAIM AND RELATED APPLICATIONS

This continuation-in-part application claims the benefit of priority from non-provisional application U.S. Ser. No. 18/119,344 filed Mar. 9, 2023. Said application is incorporated by reference in its entirety.

BACKGROUND OF THE INVENTION

1. The Field of the Invention

The present invention relates to a heating system including a photovoltaic thermal (PVT) system. More specifically, the present invention is directed to a heating system including a PVT system that is functionally connectable to an electric grid.

2. Background Art

Although solar heating technologies have existed for many years, drawbacks to conventional solar heating systems have hampered wide scale adoption of the technology. For example, due to their inefficiencies in interconnections of solar heaters to thermal batteries, conventional solar heating systems require custom connecting solutions which indirectly require significant levels of knowledge and understanding on the part of the end users or even professional installers of solar heating systems in order to assemble a solar heating system, especially a solar heating system involving electricity and thermal storage devices. This necessitates the determination of appropriate interconnections required of solar heaters and photovoltaic cells and thermal batteries and additionally one or more power sources required to make the solar heaters and thermal batteries a functional system. Additionally, the use of complex, custom designed components in many conventional solutions requires complicated interconnections between fluid transmitting parts, increasing the initial manufacturing and installation costs, as well as long term maintenance costs if components for interconnections have not been sourced properly. Another drawback to conventional systems is that consumers or even installers who are required to source photovoltaic thermal (PVT) collector systems for consumers are often deterred by the impact of the unsightly and disorganized assortment of fluid conductors, electrical harnesses and other cooperating devices have on the aesthetics of their properties on which the PVT collector systems are installed. Further, mistakes caused by poor training in the installations of such systems and the complicated interconnections between components of such systems can mean resulting systems which do not perform to their full potential and resulting systems which do not operate altogether.

It would be advantageous to provide an adaptor suitable for connecting a photovoltaic thermal collector to a thermal battery to form a functional solar thermal heating system or an adaptor suitable for connecting a solar heater and a photovoltaic collector to a thermal battery and an electric battery to form a solar thermal heating system that can also receive thermal energy one or more additional heat sources.

SUMMARY OF THE INVENTION

In accordance with the present invention, there is provided a heating system including:

(a) a thermal battery;
(b) a heat pump configured to store heat in the thermal battery;
(c) a photovoltaic thermal system including a solar electric generator and a solar thermal generator, wherein the solar thermal generator is configured to store heat in the thermal battery and the solar electric generator is configured to generate electrical charge; and
(d) a housing within which the thermal battery and the heat pump are disposed and atop which the photovoltaic thermal system is disposed.

In one embodiment, the heating system further includes at least one aperture disposed on a bottom portion of the housing, the at least one aperture configured for receiving a fastener for securing the heating system to a ground anchor. In one embodiment, the heating system further includes an electricity storage device configured to receive and store the electrical charge from the solar electric generator. In one embodiment, the heating system further includes an inverter configured to allow backfeeding of electricity from the electricity storage device to an electric grid through the inverter. In one embodiment, the housing includes a first side surface and a second side surface, wherein the heat pump is configured to draw ambient air through one of the first side surface and the second side surface and expel air through the other one of the first side surface and the second side surface. In one embodiment, the heating system further includes a resistive heater configured for generating supplemental heat to be stored in the thermal battery.

In accordance with the present invention, there is further provided a heating system including:

(a) a thermal battery;
(b) a heat pump configured to store heat in the thermal battery;
(c) a photovoltaic thermal system including a solar electric generator and a solar thermal generator, wherein the solar thermal generator is configured to store heat in the thermal battery and the solar electric generator is configured to generate electrical charge; and
(d) an electricity storage device configured to receive and store electrical charge from the solar electric generator.

In accordance with the present invention, there is further provided a heating system including:

(a) a thermal battery;
(b) a heat pump configured to store heat in the thermal battery;
(c) a photovoltaic thermal system including a solar electric generator and a solar thermal generator, wherein the solar thermal generator is configured to store heat in the thermal battery and the solar electric generator is configured to generate electrical charge; and
(d) a housing within which the thermal battery and the heat pump are disposed, the housing including a first side surface and a second side surface, wherein the heat pump is configured to draw ambient air through one of the first side surface and the second side surface and expel air through the other one of the first side surface and the second side surface.

Another object of the present invention is to provide a heating system including a photovoltaic thermal system.

Another object of the present invention is to provide a photovoltaic thermal system that can be physically and functionally coupled to a heating and/or thermal storage system installed outdoors.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
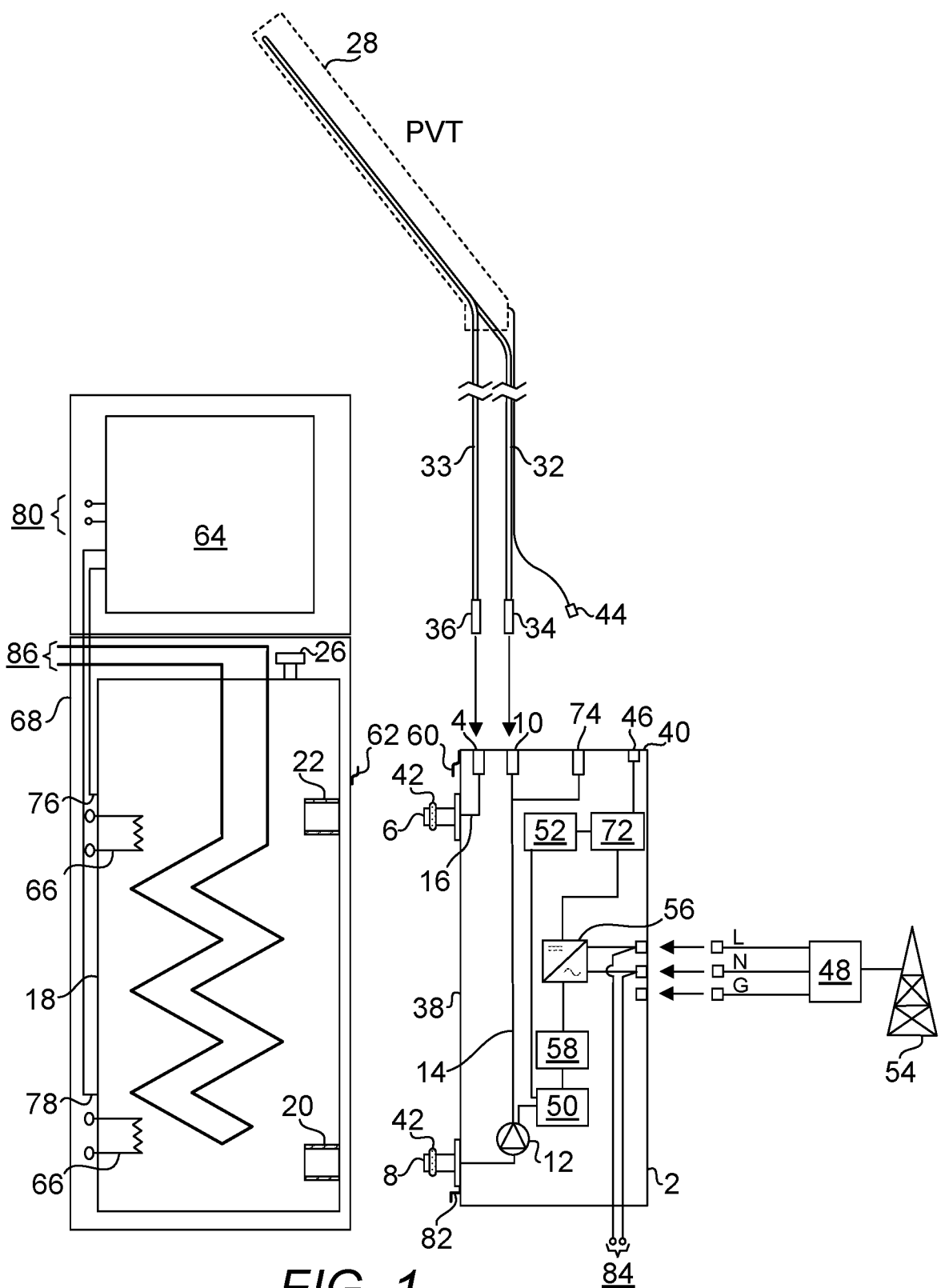
FIG. 1 is a diagram depicting one embodiment of a present adaptor configured to connect a photovoltaic thermal collector to a thermal battery.

2—adaptor
4—port
6—port
8—port
10—port
12—pump
14—conductor
16—conductor
18—thermal storage device or battery
20—port
22—port
24—working or heat transfer fluid
26—vent or opening
28—photovoltaic thermal collector or system
30—fastener
32—conductor
33—conductor
34—connector
36—connector
38—surface
40—surface
42—seal, e.g., O-ring seal
44—electrical connector
46—electrical receptacle
48—circuit breaker
50—controller
52—electricity storage device, e.g., electric battery
54—electric grid
56—inverter
58—power supply
60—hook
62—latch
64—heater, e.g., heat pump
66—heater, e.g., resistive heater
68—enclosure
70—slot
72—solar charge controller
74—auxiliary input port
76—port for receiving heated flow from heat source
78—port for allowing spent flow to heat source
80—input power port to heater
82—stand-off
84—output power port
86—heat exchanger, e.g., coil or fluid conductor
88—base support
90—fastener, e.g., screw and nut, etc.
92—base, e.g., concrete base, rooftop, etc.
94—fill valve
96—thermal charging loop
98—solar heater or solar thermal generator
100—solar electric generator
102—output from solar electric generator
104—top surface of enclosure or housing
106—compressor
108—charging circuit
110—heat exchanger
112—expansion valve
114—evaporator
116—fan
118—pump
120—check valve
122—inlet valve
124—isolation valve
126—bypass valve
128—water inlet
130—water outlet
132—point of use, e.g., shower
134—ground
136—wall
138—enclosure or housing
140—aperture
142—surface through which air flow can occur
144—apertures disposed on a surface to allow air flow
146—surface through which air flow can occur
148—user interface
150—incoming air flow
152—outgoing air flow 154—subsystem
156—subsystem
158—storage container
160—heat supply loop
162—bypass conductor
164—post
166—base
168—hinged connection
170—plate

PARTICULAR ADVANTAGES OF THE INVENTION

The present adaptor allows a suitable photovoltaic thermal collector to be functionally connected to a thermal battery without requiring modifications to be made to any part of the photovoltaic thermal collector and the thermal battery and electric battery if it is utilized. The present adaptor simplifies connections between a photovoltaic thermal collector and a thermal battery, removing or reducing the need for a trained installer for installation of a photovoltaic thermal (PVT) system. In one embodiment, a present adaptor further simplifies connections between a photovoltaic thermal collector with an electric grid, allowing surplus electricity to be supplied to the electric grid from the photovoltaic thermal collector.

Further, Applicant found it to be beneficial to dispose a heating system outdoors even when there are threats of freezing, e.g., in temperate climate conditions where the ambient temperature routinely drops below freezing, to allocate valuable indoor spaces for other uses. A non-solar-based heating system also serves as a convenient and sturdy mounting base for solar-based energy harvester, e.g., solar heater and solar electric generator. No additional or dedicated solar mounting structures are required as the present solar heater and solar electric generator can be disposed atop a present enclosure which already serves as a protective case for the present non-solar-based heating system. The disposition of the thermal battery within the housing makes the housing stable due to the weight of its contents, e.g., 60 gallons of a glycol mixture even under severe outdoor conditions, making the present heating system suitable to be placed in an outdoor environment which can experience severe weather conditions. The present heating system is configured to be securable to the ground or rooftop to withstand strong winds.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

A photovoltaic thermal (PVT) system is a technology that combines the benefits of both solar photovoltaic (PV) or solar electric generator and a solar thermal system or a solar heater in a single integrated system. It generates both electricity and heat from the sun's energy, maximizing the utilization of solar radiation.

A typical PVT system includes solar panels that have photovoltaic cells to convert sunlight into electricity, as well as a thermal collector to capture heat from the solar radiation. The PV cells convert the sunlight directly into electricity, while the thermal collector absorbs the excess heat that is not converted into electricity. By extracting heat from the PV modules, PVT systems can cool down the PV cells, improving their efficiency and overall performance. This cooling effect is known as "hybrid cooling" and helps to increase the electricity generation efficiency of the PV cells.

The electricity generated by the PV cells can be used on-site to power electrical appliances or fed back into the electric grid for distribution to other users connected to the electric grid. The combined production of electricity and heat from a PVT system can significantly increase the overall energy efficiency compared to separate PV and thermal systems. PVT systems are particularly useful in applications where both electricity and heat are required, such as residential and commercial buildings, as well as industrial processes that demand both power and heat. They offer an efficient way to harness solar energy, reduce reliance on fossil fuels, and contribute to sustainable energy solutions.

FIG. 1 is a diagram depicting one embodiment of a present adaptor 2 configured to connect a photovoltaic thermal or PVT collector or a combined solar electric generator and a solar heater to a thermal battery. The adaptor 2 is useful for adapting a photovoltaic thermal collector 28 for heating a working fluid stored in a thermal storage device 18. The adaptor 2 is essentially a body including interfaces such as a first port 4, a second port 6 fluidly connected to the first port 4, a third port 8 and a fourth port 10 fluidly connected to the third port 8 and a pump 12 configured for receiving a fluid through the third port 8 and pulling the fluid through the third port 8 from a thermal storage device 18 to the fourth port 10. The first port 4 and the fourth port 10 are configured to be supplied on a first surface 38 and the second port 6 and third port 8 are configured to be supplied on a second surface 40 of the body. The first surface 38 is preferably a surface disposed in a different plane from the second surface 40 as the first surface 38, upon the installation of adaptor, will no longer be accessible. With a present adaptor 2, a technician or installer of the PVT heating system needs only to ensure that ports on one surface are connected to fluid conductors of the solar heater and ports on the other surface are inserted into ports disposed on one side of the thermal battery, removing any guesswork on the part of the technician or installer and installation mistakes that can cause a drop in efficiency of the operations of the heating system and also mistakes that can also prevent optimal operations of the heating system can be avoided. The body can be a block having a plurality of surfaces including the first surface 38 and second surface 40. No working fluid is shown disposed in the thermal battery 18 of FIG. 1. In the embodiment shown, the adaptor 2 further includes an electrical receptacle 46 for receiving an electrical connection via an electrical connector 44 from the solar electric generator. Therefore, in addition to the fluid connections via the ports 4, 6, 8 and 10, there is provided an electrical connection which facilitates the connection of the solar electric generator with the necessarily equipment in the adaptor that it interfaces with. This further eliminates any guesswork on the part of the installer. In the embodiment shown, the electrical receptacle 46 is electrically connected to a solar charge controller 72 which handles the charging of an electricity storage device, e.g., a battery 52. This battery 52 is useful for powering a controller 50 which controls and supplies power to the pump 12 that drives a working fluid 24 through the conductor that connects the third port 8 and the fourth port 10 to the solar heater to be heated before returning through the conductor that connects the first port 4 and the second port 6 into the thermal battery 18. Without an external power source, e.g., power from an electric grid 54, the PVT can function provided that there is sufficient solar power received by the solar electric generator and solar heater. However, with access to an electric grid 54 protected by circuit breaker 48, the PVT can be configured to not only transfer sufficient solar power for its own use, but also backfeed surplus electricity generated by the solar electric generator to the electric grid 54 once the battery 52 it is configured to charge has been fully charged. An inverter 56 is interposed between the solar charge controller 72 and a power supply 58 which alternatively or additionally provides power to the controller 50 and the pump 12. An additional output power port 84 may also be provided to power heater 64, e.g., a heat pump, by connecting port 84 to port 80 of heater 64 to power the compressor of the heat pump. With access to the electric grid 54, the heating system can be operational even if the battery 52 has been insufficiently charged from which to draw power to power the pump 12 as the power supply 58 which receives its input power from the inverter 56 is capable of supplying not only power to the pump 12 for circulating the working fluid 24 but also any devices operationally connected to it. In one embodiment, the inlet of the pump 12 is configured to be disposed at a level substantially the same, e.g., within about 1-2 inches, as the level at which the third port 8 is disposed or at a level as far below as possible from the second port 6 to afford the pump 12 sufficient or maximum head during operation and as much head as possible for self-priming during the first start-up of the pump 12. It shall be noted that the third port 8 is disposed at a level lower than the second port 6.

In the embodiment shown, each of the second port 6 and the third port 8 is configured for a quick connection or disconnection with the thermal storage device 18. A quick connection or disconnection between two mating ports allows the two mating ports to be coupled to form a leak-free fluid connection or the two mated ports to be disconnected without requiring a significant amount of effort, reducing the amount of effort, time and expense for assembling/installing or dismantling a heating system utilizing such a mechanism. In order to achieve liquid-tight connections while allowing easy insertion of one port in the other, each of the second port 6 and the third port 8 is equipped with a seal about its periphery. In order to retain a seal on each, a groove is disposed about a periphery of each such that a seal 42, e.g., an O-ring can be disposed within the groove and retained therein.

Figure 2:
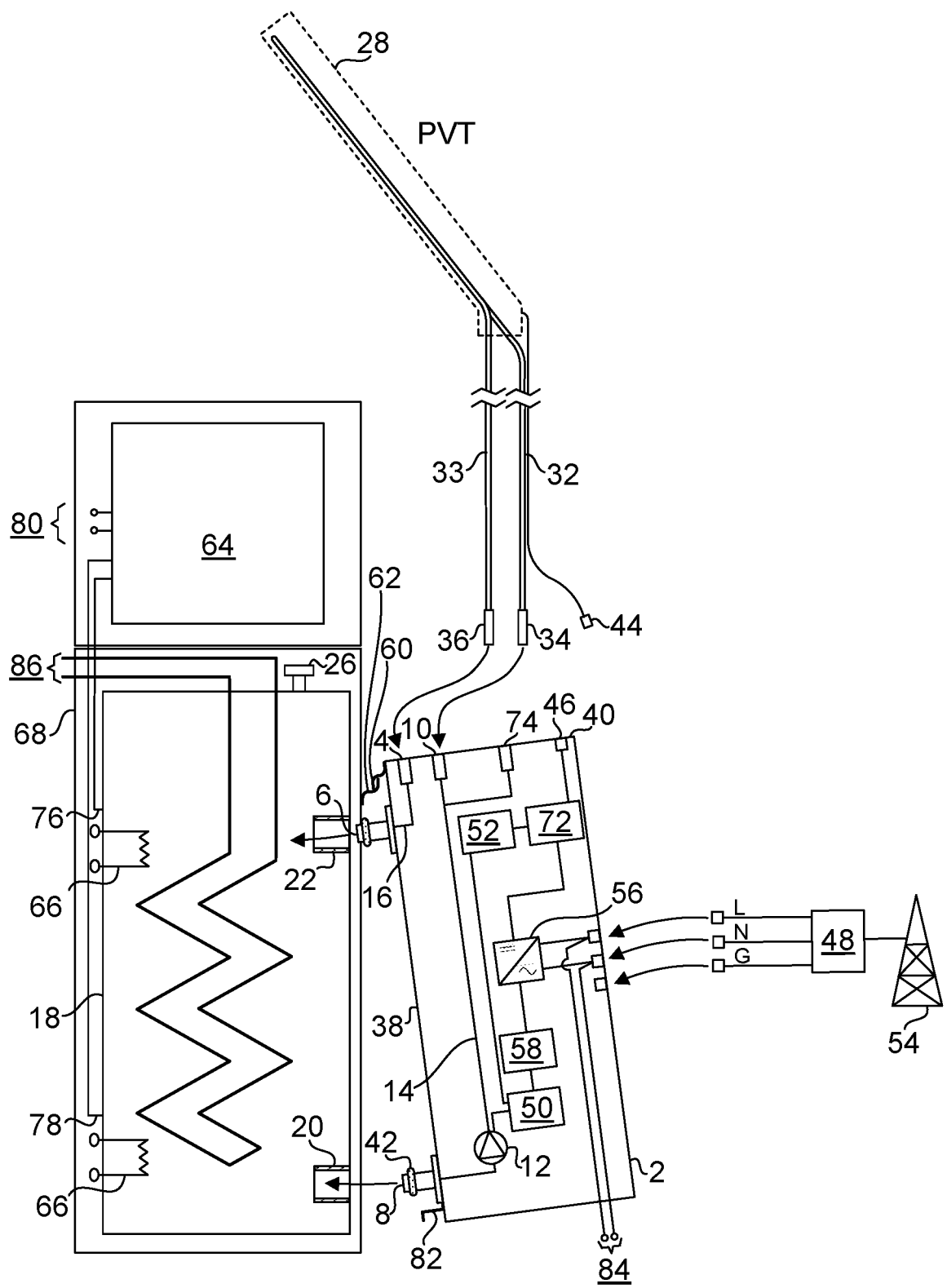
FIG. 2 is a diagram depicting one embodiment of a present adaptor being used to connect a photovoltaic thermal collector to a thermal battery.
Figure 3:
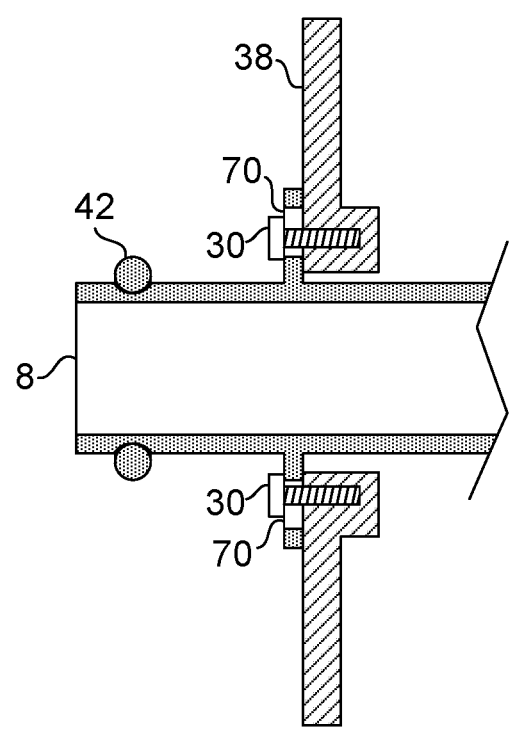
FIG. 3 is a cross-sectional view of the third port depicting one embodiment of an adjustment mechanism which allows the position of the third port to be adjustable relative to the surface upon which the third port is mounted.

FIG. 2 is a diagram depicting one embodiment of a present adaptor 2 being used to connect a PVT collector to a thermal battery. As shown in FIG. 2, the alignment of the second port 6 with respect to receiving port 22 and the third port 8 with respect to receiving port 20 are further facilitated using a hook 60 configured for interfacing with a latch 62 disposed on an enclosure 68 of the thermal storage device 18 such that a portion of the weight of the adaptor 2 is supported on the enclosure 68 while the second port 6 and the third port 8 are fluidly coupled with the thermal storage device 18. Each of the hook and the latch is essentially a part having a cross-sectional profile shown but a part which extends orthogonally from the cross-sectional profile. An installer of the heating system can first focus on hanging the adaptor 2 on the enclosure 68 at roughly the level the adaptor 2 is to be coupled to the thermal storage device 18. As the ports, once connected, interface with a working fluid, e.g., a glycol mixture, care must be taken to ensure that the ports are connected snugly to prevent leakages. The hook-and-latch mechanism affords the installer time to adjust the positioning of at least one of the ports 6, 8 properly. A stand-off 82 is provided substantially on an opposing end of the surface 38 from the hook 60 to ensure that, once seated as shown elsewhere herein, the adaptor 2 no longer has the tendency to rotate to cause dislodgement of the second port 6 from port 22 and any potential rattling that can occur due to contacts of the adaptor 2 and the enclosure 68 caused by wind and vibrations from equipment, e.g., pump 12, can be minimized. The adaptor 2 is preferably further secured at the stand-off 82 to the enclosure 68 using, e.g., one or more fasteners. In one embodiment, the second port 6 is fixedly positioned on surface 38 while the third port 8 is configured to be adjustable. Despite efforts in ensuring precision manufacturing practices have been adhered to, mechanical parts are often still being made with a wide range of tolerances. Heating system parts are no exception. Therefore, it is imperative that for the adaptor 2 to be mateable by way of the thermal battery ports 20, 22, the position of at least one of the second port 6 and third port 8 is adjustable. FIG. 3 is a cross-sectional view of the third port 8 depicting one embodiment of an adjustment mechanism which allows the position of the third port 8 to be adjustable relative to the surface 38 upon which the third port 8 is mounted. Here, the third port 8 includes a flange having a plurality of slots 70, one disposed on each side of the third port 8. These slots 70 allow the port 8 to be slid up and down along surface 38 of the adaptor 2 before the fasteners 30 are tightened to secure the third port 8 in place. In another embodiment, the positioning of the second port 6 is made adjustable instead. In yet another embodiment, the positioning of each of the second port 6 and the third port 8 relative to surface 38 is made adjustable. In one embodiment, at least a portion of a fluid conductor 16 connecting the first port 4 and the second port 6 is a flexible fluid conductor to make positional adjustment of the second port 6 easier. In one embodiment, at least a portion of a fluid conductor 14 connecting the third port 8 and the fourth port 10 is a flexible fluid conductor to make positional adjustment of the fourth port 10 easier.

Figure 4:
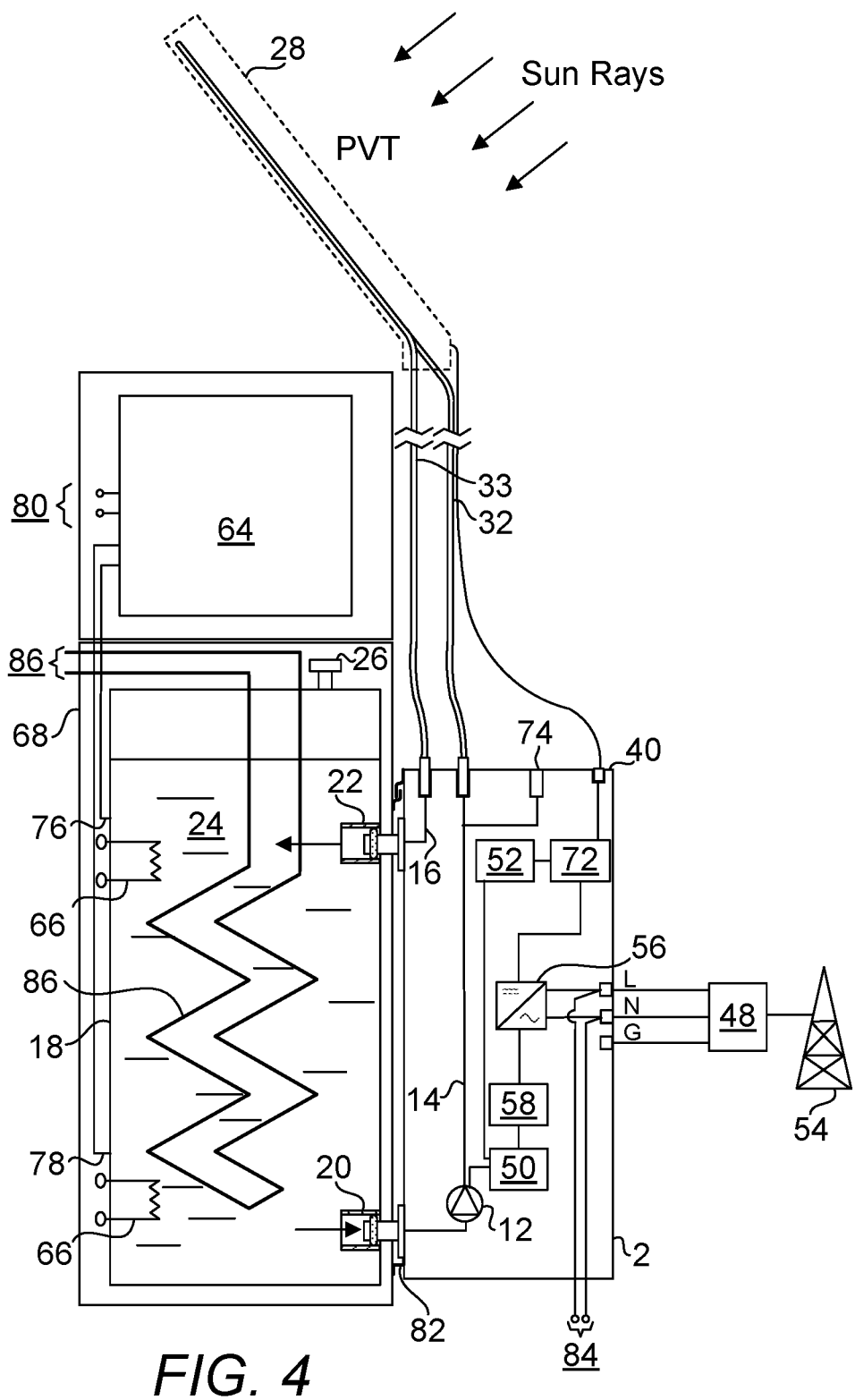
FIG. 4 is a diagram depicting one embodiment of a present adaptor having been used to connect a photovoltaic thermal collector to a thermal battery.
Figure 5:
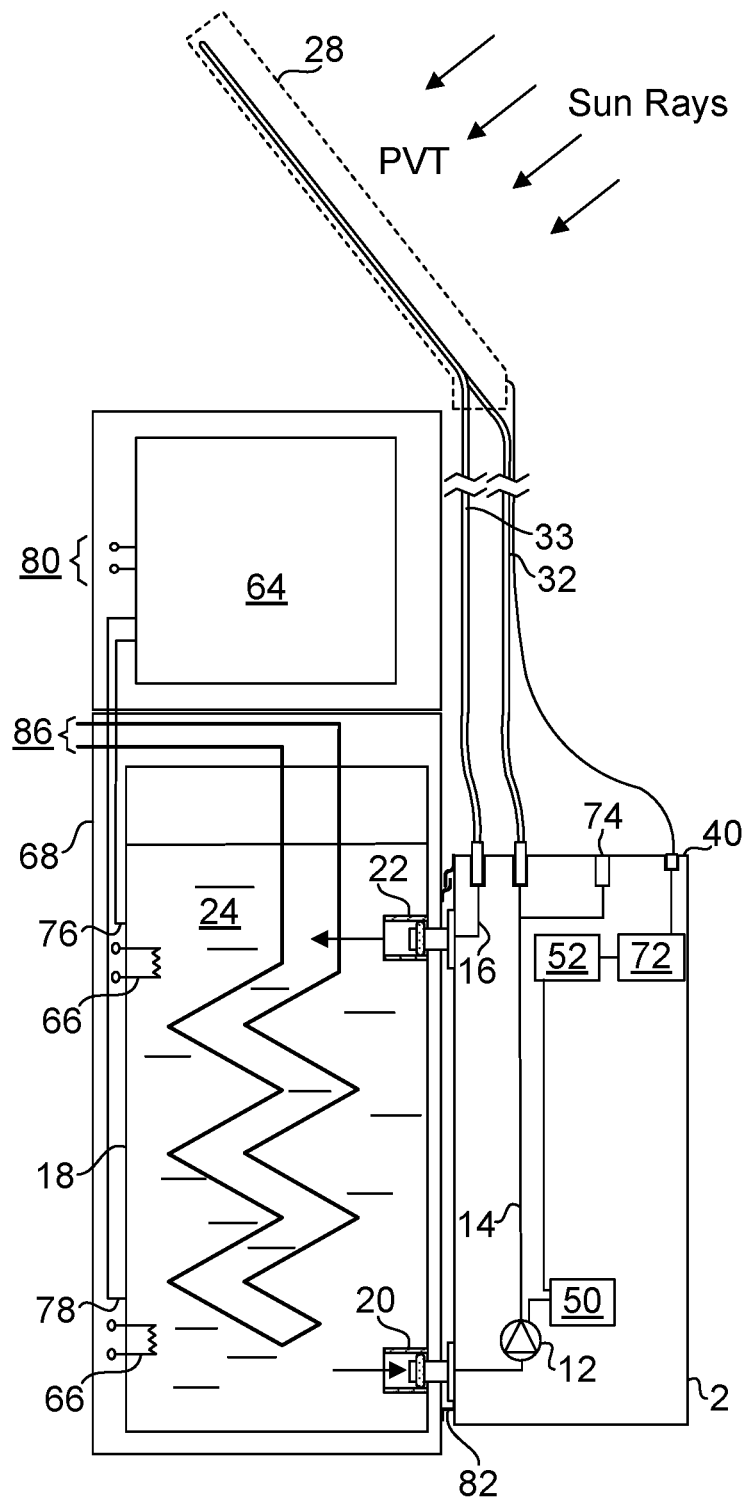
FIG. 5 is a diagram depicting one embodiment of a present adaptor having been used to connect a photovoltaic thermal collector to a thermal battery.

FIG. 4 is a diagram depicting one embodiment of a present adaptor 2 having been used to connect a photovoltaic thermal collector to a thermal battery 18. Heated flow of the solar heater is received by the thermal battery 18 via fluid conductor 33 and connector 36 that is mated with port 4 while spent flow from the thermal battery 18 is sent through connector 34 and fluid conductor 32 back to the solar heater. It shall be noted that the thermal battery 18 is now filled with a working fluid 24, e.g., a glycol mixture, the interior of the thermal battery 18 is vented using a vent 26. In one embodiment, the adaptor 2 further includes a fifth port 74 fluidly connected to the third port 8, the fifth port 74 is configured to be a bleed port to allow the pump 12 to be self-primed at the first start-up upon installation with the working fluid, e.g., a glycol mixture used to fill the thermal battery 18. In one embodiment, once the thermal battery 18 has been deemed operational, the fifth port 74 is capped to prevent evaporation of the contents of the thermal battery 18 through it. The heating system is transported with the thermal battery 18 void of a working fluid 24 to save on transportation costs and other expenses due to the transportation of a liquid which can be constituted onsite. Once the adaptor 2 has been coupled with the thermal battery 18 and the PVT, the pump 12 can be turned on to circulate a working fluid 24 to transport heated working fluid from the solar heater to the thermal battery 18. In one embodiment, this process continues until the controller 50 determines that the thermal battery 18 has been sufficiently thermally charged, at which point the pump 12 is then turned off. Once charged, the thermal battery 18 becomes a heat source to heat a cold water supply requested through heat exchanger, e.g., coil 86. The adaptor 2 can additionally serve as an electrical and/or additionally fluid interface for an additional heater, e.g., a resistive heater 66 and a heat source, e.g., a heat pump 64 circulating the working fluid 24 by emptying heated working fluid through port 76 and drawing spent working fluid 24 through port 78. In the embodiment shown, there is further provided an auxiliary port 76 connected to the fourth port 10. If necessary, both ports 74, 76 can be utilized to add an additional heat source, e.g., another heat pump to increase the rate at which the thermal battery 18 can be charged. FIG. 5 is a diagram depicting one embodiment of a present adaptor 2 having been used to connect a photovoltaic thermal power generator to a thermal battery 18. Here, the adaptor 2 is suitable for use in locales where no electric grid 54 is available. Devices required for accessing an electric grid is absent as electric energy required to power the pump 12 is drawn directly from the solar electric generator. If the battery 52 has become fully charged and the thermal battery 18 has become charged to the desired level, no part of the PVT 28 is able to continue to harvest and store energy in the forms of electrical energy and thermal energy. It can be seen in all the embodiments disclosed herein that the adaptor 2 reduces what would otherwise be a heating system largely unfamiliar to installation technicians of conventional heating systems of other fuels to mating parts and steps that are intuitive to set up a PVT to a thermal battery, reducing the potential for mistakes and increasing the efficiency in setting up the PVT heating system.

Figure 6:
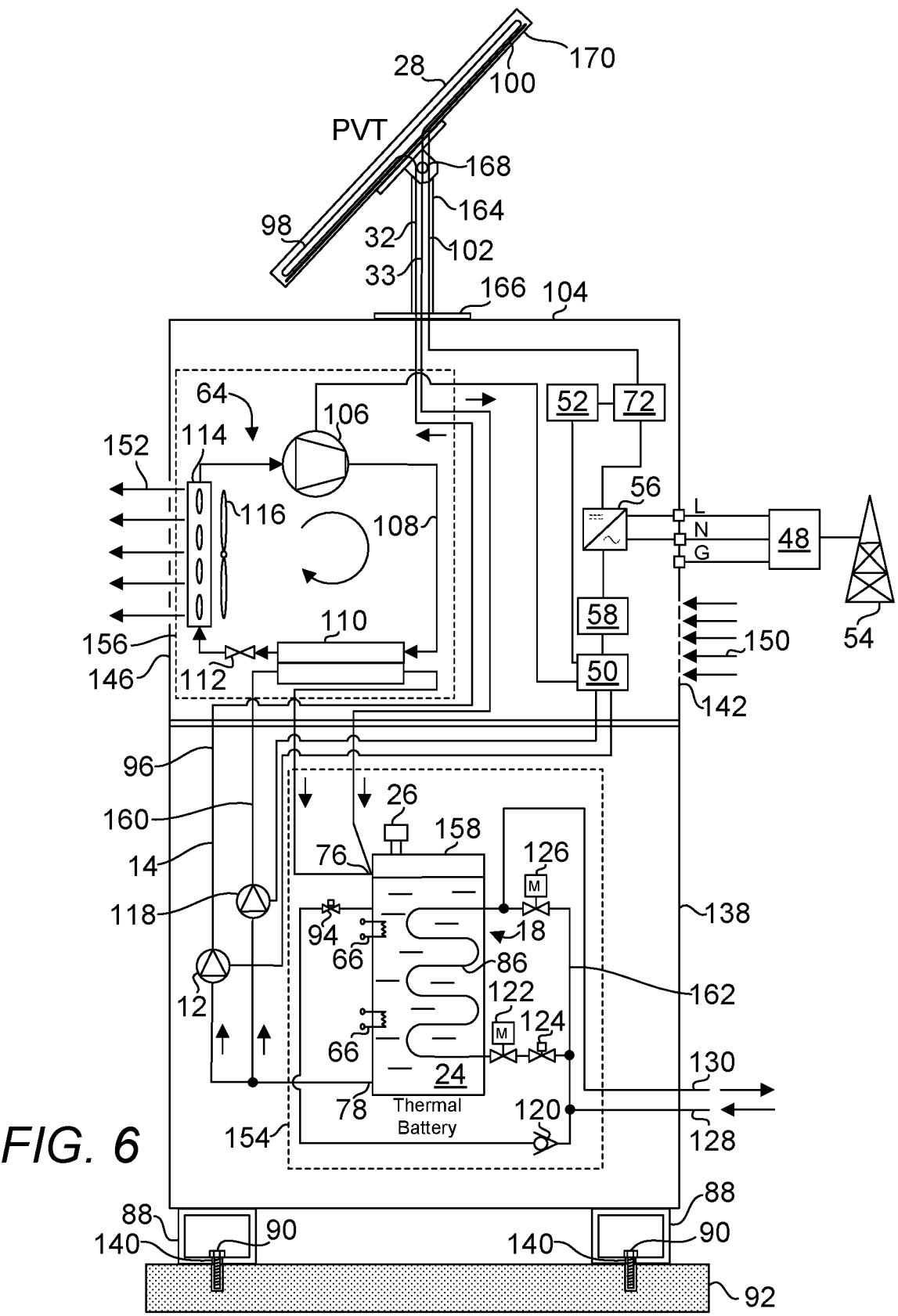
FIG. 6 is a diagram depicting one embodiment of a heating system including a photovoltaic thermal system.
Figure 7:
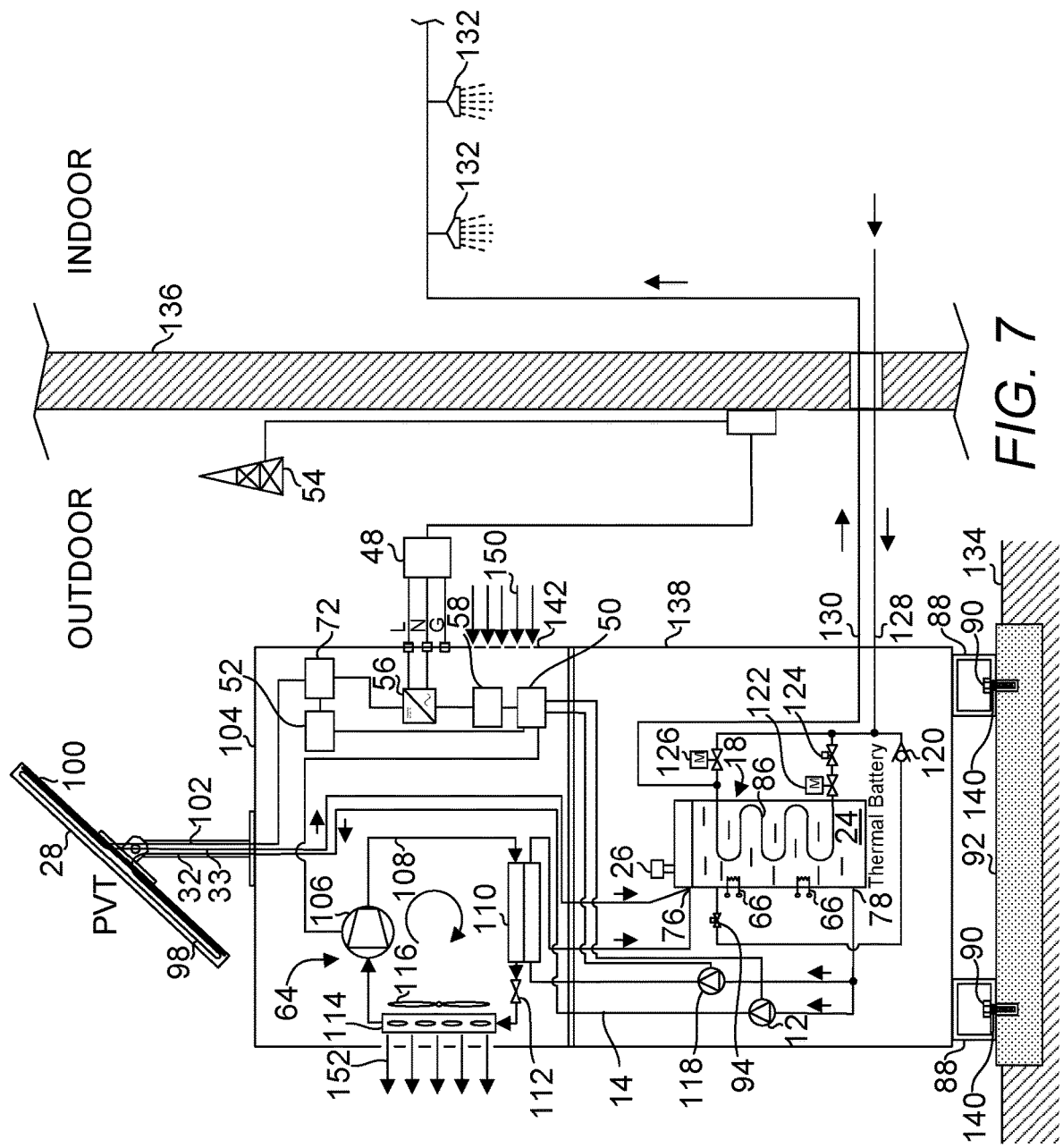
FIG. 7 is a diagram depicting one embodiment of a heating system including a photovoltaic thermal system shown disposed in an outdoor environment while providing hot water.

FIG. 6 is a diagram depicting one embodiment of a heating system including a photovoltaic thermal system. FIG. 7 is a diagram depicting one embodiment of a heating system including a photovoltaic thermal system shown disposed in an outdoor environment while providing hot water at points of use 132. The heating system disclosed in FIGS. 6-7 is similar to the heating systems disclosed elsewhere herein with the exception that interconnections of some services provided on the present heating system of FIGS. 6-7 are not shown disposed on an adaptor but rather devices are shown connected directly and alternatively. The mounting or securing details of the heating system are shown in FIGS. 6-7 to depict a heating system suitable and capable to be disposed outdoors. The heating system includes a thermal battery 18, a heat pump 64, a photovoltaic thermal system 28 and a housing 138. The heat pump 64 is configured to store heat in the thermal battery 18. The photovoltaic thermal system 28 includes a solar electric generator 100 and a solar heater or thermal generator 98 configured to supply heat to the thermal battery 18 via thermal charging loop 96. In one embodiment, the solar electric generator 100 is configured to power the heat pump 64 or/and other devices requiring electric power. In another embodiment, the solar electric generator 100 is useful in supplementing the electricity consumption of any electrical devices of the heating system either by directly powering any devices requiring electrical power directly or by supplying electrical energy stored in an electrical battery. In another embodiment, the present heating system includes an inverter 56 configured to allow backfeeding of electricity from an electricity storage device 52 to an electric grid. The electricity storage device 52 is configured to receive electrical energy from an output 102 from solar electric generator via a solar charge controller 72. The thermal battery 18 and the heat pump 64 are disposed within the housing 138 atop which the photovoltaic thermal system 28 is disposed. By disposing the photovoltaic thermal system outdoors, e.g., outside of an interior space outlined by a wall 136, valuable interior space can be saved for other uses. In one embodiment, the photovoltaic thermal system is mounted to the top surface 104 of the housing 138 using a stand including a plate 170 for holding the photovoltaic thermal system 28 where the plate 170 is hingedly connected via a hinged connection 168 to a post 164 terminated at one end at a base 166 that is secured, e.g., with fasteners to the housing 138. The photovoltaic thermal system is accessible for service while disposed outdoors without the need for service personnel to first gain access to a system indoors. As the present heating system is disposed outdoors, there is no need for the heat pump portion of the heating system to be disposed separately from the other parts, e.g., the thermal battery, of the heating system. As the thermal battery 18 is disposed in a housing that holds other parts of the heating system, the weight of the thermal battery 18 assists in stabilizing the heating system under strong wind conditions. In the embodiment shown in FIGS. 6 and 7, the heating system further includes apertures 140 disposed on base supports 88 which allow fasteners 90 to be disposed through the apertures 140 to secure the housing 138 to a base 92, e.g., a concrete base disposed at least partially in the ground 134, which serves as a ground anchor. Other types of ground anchors may be used, e.g., soil screws, foundations and roof structures, etc. The heating system includes essentially two subsystems, i.e., subsystem 154 which holds an interface between a heat source and a heat sink and subsystem 156 which serves as a heat source. In the embodiment shown, the heat source is a heat pump 64. Each subsystem may herein be individually referred to as a heating system as it either receives heating from another system or subsystem, as in subsystem 154 or it is responsible for supplying thermal energy to another system or subsystem, as in subsystem 156. Regarding subsystem 154, the heating system includes a thermal battery 18 which includes a storage container 158 and a fluid conductor 86 disposed through the storage container 158. The storage container 158 includes an opening 26 and is configured to hold a heat transfer fluid 24 therein. The opening 26 is configured to expose the contents 24 of the thermal battery 18 to atmospheric pressure. As such, the storage container 158 is not a pressurized vessel and not required to withstand pressure exerted by pressurized contents and therefore can be made to meet minimal requirements of a storage container, resulting in an inexpensive, easy-to-fabricate and maintain storage container. Contrast this to conventional thermal batteries where pressurized tanks are used. The container 158 needs not be built to withstand a pressure higher than the ambient pressure and therefore no special materials and container wall thicknesses that are required to provide a container capable of withstanding pressure significantly higher than the ambient pressure. Such a container is therefore ubiquitous, has low procurement and maintenance costs. Referring to subsystem 154, it shall be noted that cold water is received at a cold water inlet 128 with an inlet pipe which connects the cold water inlet 128 to the fluid conductor 86. Heated water is supplied at a hot water outlet 130 via an outlet pipe which connects the fluid conductor 86 to the hot water outlet 130. The fluid conductor 86 is disposed through the heat transfer fluid 24, e.g., glycol-water mixture, from an inlet point 128 at the storage container 158 to an outlet point 130 at the storage container 158, the fluid conductor 86 is configured to receive a second fluid, e.g., domestic or potable water, at a first temperature at the inlet point and to supply the second fluid at a second temperature that is higher than the first temperature.

In the embodiment shown, subsystem 154 further includes a heat source configured to supply fluid 24 with thermal energy via the working fluid exiting the storage container 158 through outlet 78 and returning to the storage container through inlet 76. Here, thermal energy is received via a flow motivated by pump 118 through heat exchanger 110. In one embodiment, the pump 118 is a variable speed pump to allow the system to modulate the flowrate through the heat supply loop 160, thereby affecting the thermal charging rate of the thermal battery 18. For instance, the thermal charging rate of the thermal battery 18 may be correlated to the rate at which thermal energy may be transferred from subsystem 156 to avoid unnecessary circulation of the heat transfer fluid 24 when a higher rate of thermal charging is used. The heat transfer fluid 24 held in the storage container is stratified, i.e., the temperature of the first fluid near the top of the storage container is disposed at a temperature higher than the first fluid near the bottom of the storage container. The heat transfer fluid 24 is disposed at a first temperature at port 78 and the heat transfer fluid 24 is disposed at a second temperature at port 76 where the second temperature is higher than the first temperature. As the first temperature is lower and the thermal energy of the contents in the lower region of the storage container has been largely depleted, this ensures that the heat transfer fluid drawn by the pump 118 is devoid of thermal energy and ready to draw thermal energy from heating system 156. In one embodiment, the heat transfer fluid 24 is a glycol-water mixture or it is simply referred to as "glycol." Subsystem 154 further includes a fill valve 94 configured to control the filling of the storage container 18 and a check valve 120 disposed on a supply line of the fill valve 94 to prevent accidental co-mingling of the contents of the thermal battery 18 with a domestic cold water supply. A glycol solution can be formed by adding water via fill valve 94 to glycol already disposed in the storage container 18. The present heating system is shipped to site with the storage container 18 void of fluid to avoid unnecessary shipment of weighted storage container and the storage container 18 is filled on site to make transportation of the heating system more cost effective and the heating system easier to set up. Subsystem 154 further includes a bypass conductor 162 connecting an inlet and an outlet of the fluid conductor 86. A valve 126 is interposed in the bypass conductor 162 to control the magnitude of a bypass flow that is allowed to occur through the bypass conductor 162. An inlet valve 8 is disposed at the inlet of the fluid conductor 86 to control the magnitude of a flow through the fluid conductor 86. A coil isolation valve 124 is connected to an inlet point of fluid conductor 86, wherein the coil isolation valve 124 is configured for selectively allowing a flow of a domestic water flow. The coil isolation valve 124 serves as a fail-safe mechanism for an inlet valve 122 which can fail as the coil isolation valve 124 is a spring-returned valve configured to close automatically should the inlet valve 122, e.g., a proportional valve fails. This way, a failed inlet valve 122 would not inadvertently cause a flow to be heated indefinitely in the thermal battery 18 to cause a scalding hot output at the outlet 130. Once the coil isolation valve 124 is closed, an incoming flow through the cold water inlet 18 will be diverted to the bypass conductor 162. A user of the demand will experience unheated water but will avoid potentially scalding hot water due to the failed inlet valve 122. The pump 118 interposed in the heat supply loop 160 connected to the storage container 18 at an outlet 78 and at an inlet 76, controls the magnitude of circulation of the contents of the storage container 18 and hence controls the rate at which heat energy is supplied to the contents 24 of the storage container 18.

Regarding subsystem 156, the heating system includes a charging circuit 108, an evaporator 114, a fan 116 functionally coupled to the evaporator 114, a compressor 106, an expansion valve 112, all of which are disposed on the charging circuit 108. Although an example of a heat pump is shown here, other configurations of a heat pump may be used as long as the devices are configured to operate under the basic principles of a heat pump. Heat exchanger 110 thermally connects the charging circuit 108 of subsystem 156 with heat supply loop 160 of subsystem 154. The fan 116 is operable to supply a stream of air over the evaporator 114, wherein the evaporator 114 and the compressor 106 are fluidly connected in the charging circuit 108 with the heat exchanger 110 being disposed in a manner to transfer heat between a heat transfer fluid disposed in the charging circuit 108 to the heat transfer fluid 24 of the thermal battery 18. In one embodiment, the heat transfer fluid of heat pump 64 is a refrigerant, e.g., carbon dioxide. A circulation of the heat transfer fluid of the heat pump 64 by the compressor 106 causes the heat transfer fluid to lose heat at heat exchanger 110 before experiencing an expansion at the expansion valve 112 and absorbing heat at the evaporator 114 prior to returning to the compressor 106 which further adds thermal energy to the heat transfer fluid. At heat exchanger 110, heat transfer then occurs from the charging circuit 108 to heat transfer loop 160. In heat exchanger 110, thermal energy is transferred from the working fluid in charging circuit 108 to the working fluid of the heat supply loop 160. In addition to subsystem 156, the thermal battery 18 may additionally or alternatively receive thermal energy from the solar heater 98. A pump 12 is provided to allow circulation of the working fluid through the solar heater 98 to add thermal energy to the contents of the storage container 158. Again, the flow exiting the storage container 158 at the outlet fluid conductor is preferably disposed at the lowest temperature possible due to stratification of the contents of the storage container 158 to maximize heat transfer to the working fluid at the solar heater 98.

Figure 8:
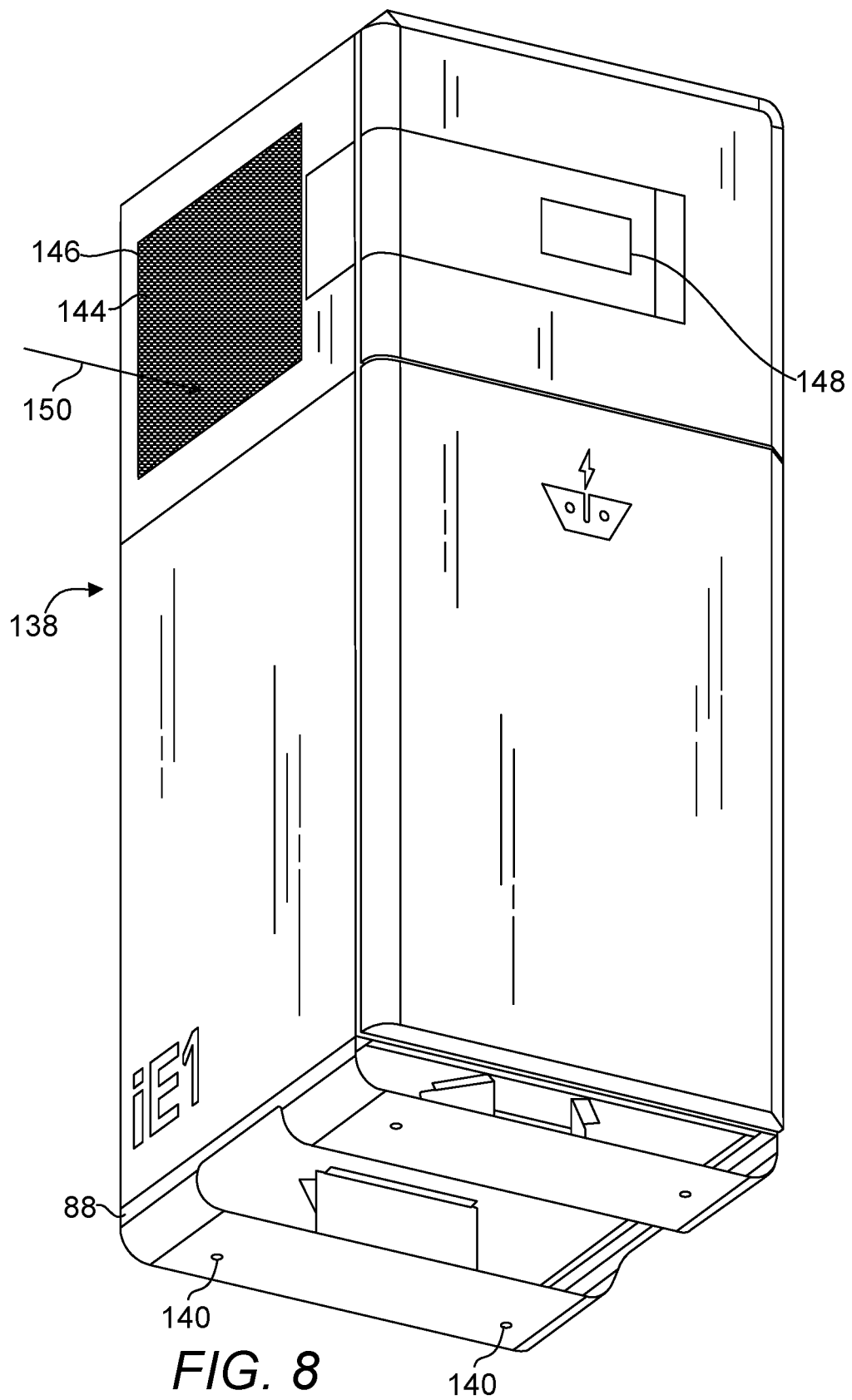
FIG. 8 is a bottom front perspective view of one embodiment of a heating system depicting an air flow entering the heating system as drawn by a fan of a heat pump of the present heating system.
Figure 9:
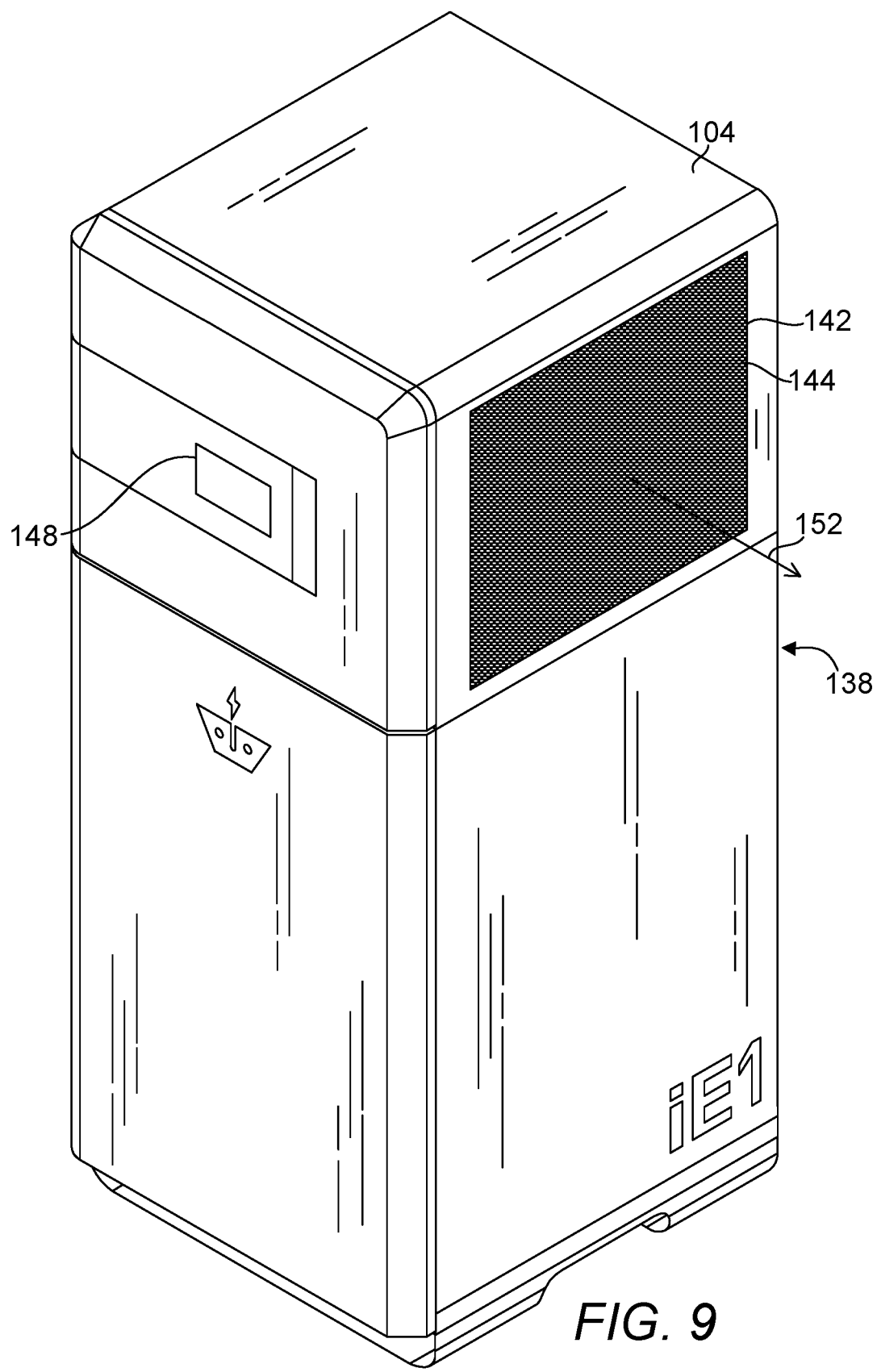
FIG. 9 is a top front perspective view of one embodiment of a heating system depicting an air flow entering the heating system as drawn by a fan of a heat pump of the present heating system.
Figure 10:
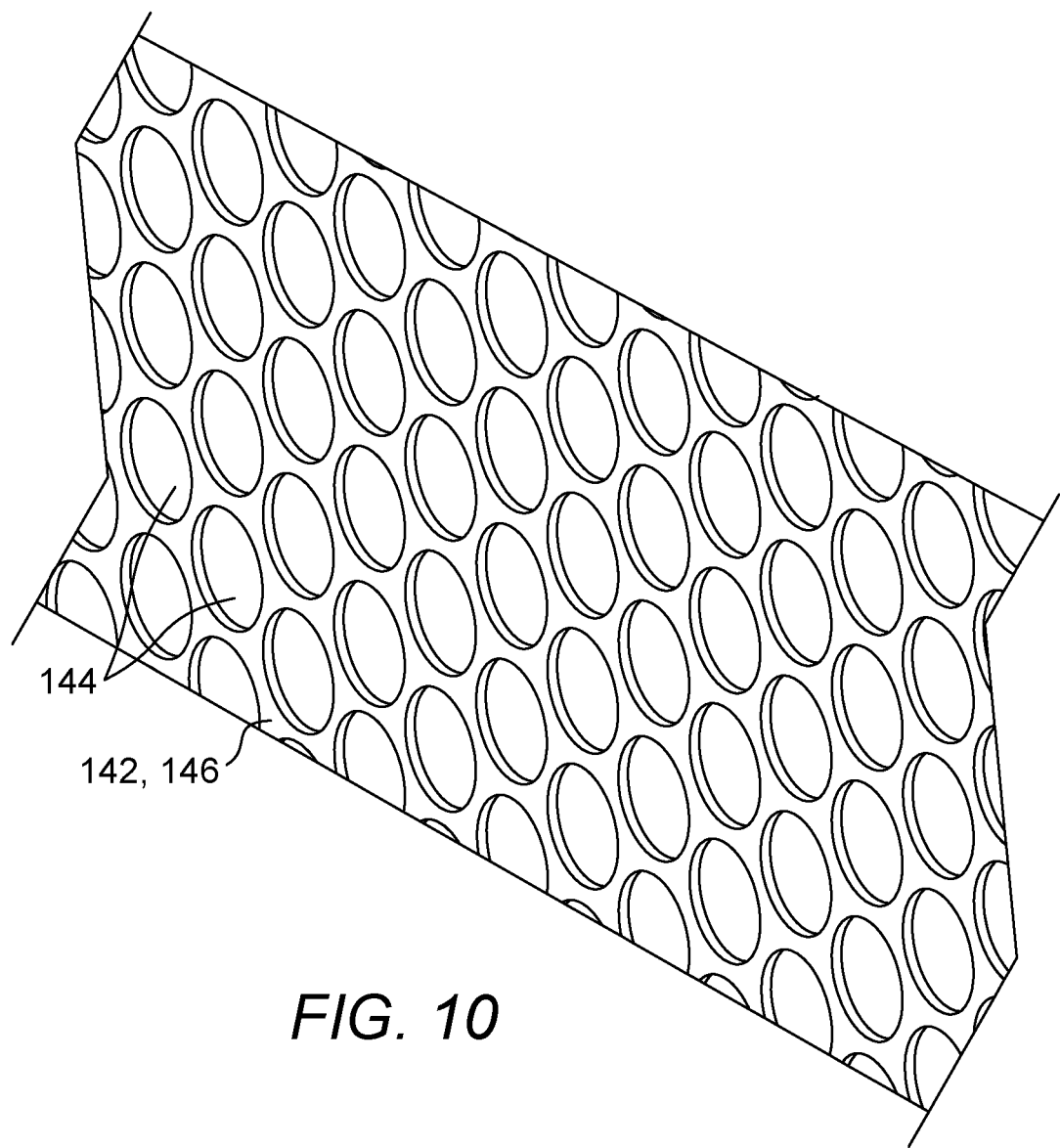
FIG. 10 is a perspective view of a portion of a surface through which air flow can occur.

FIG. 8 is a bottom front perspective view of one embodiment of a heating system depicting an air flow entering the heating system as drawn by a fan of a heat pump of the present heating system. FIG. 9 is a top front perspective view of one embodiment of a heating system depicting an air flow entering the heating system as drawn by a fan of a heat pump of the present heating system. No photovoltaic thermal system is shown atop the housing 138. FIG. 10 is a perspective view of a portion of a surface through which air flow can occur. The housing includes a first side surface 142 and a second side surface 146, wherein the heat pump is configured to draw ambient air through one of the first side surface 142 and the second side surface 146 to cause incoming air flow 150 and expel air through the other one of the first side surface 142 and the second side surface 146 to cause outcoming air flow 152. It shall be noted that, in this arrangement, the top surface 104 of the housing is not used for allowing air flow, therefore providing a sufficiently large and sturdy surface area for the photovoltaic thermal system to be supported thereon. It has been conventional thinking to at least draw warm air through a top surface of a housing as warmer air is disposed at a higher elevation. However, Applicant discovered the disposition of air flow paths on side surfaces outweigh the benefits of disposing an air flow path through the top surface as this allows the photovoltaic thermal system to be mounted atop the housing without an exhaust air flow affecting the photovoltaic thermal system performance. In one embodiment, the heating system further includes at least one resistive heater 66 configured for generating supplemental heat to be stored in the thermal battery 18 when a hot water demand cannot be met by other heat sources.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A heating system comprising:
   (a) a thermal battery;
   (b) a heat pump configured to store heat in said thermal battery;
   (c) a photovoltaic thermal system comprising a solar electric generator and a solar thermal generator, wherein said solar thermal generator is configured to store heat in said thermal battery and said solar electric generator is configured to generate electrical charge;
   (d) a housing within which said thermal battery and said heat pump are disposed and atop which said photovoltaic thermal system is disposed; and
   (e) at least one aperture disposed on a bottom portion of said housing, said at least one aperture configured for receiving a fastener for securing said heating system to a ground anchor.

2. The heating system of claim 1, further comprising at least one aperture disposed on a bottom portion of said housing, said at least one aperture configured for receiving a fastener for securing said heating system to a ground anchor.

3. The heating system of claim 1, further comprising an electricity storage device configured to receive and store the electrical charge from said solar electric generator.

4. The heating system of claim 3, further comprising an inverter configured to allow backfeeding of electricity from said electricity storage device to an electric grid through said inverter.

5. A heating system comprising:
   (a) a thermal battery;
   (b) a heat pump configured to store heat in said thermal battery;
   (c) a photovoltaic thermal system comprising a solar electric generator and a solar thermal generator, wherein said solar thermal generator is configured to store heat in said thermal battery and said solar electric generator is configured to generate electrical charge; and
   (d) a housing within which said thermal battery and said heat pump are disposed and atop which said photovoltaic thermal system is disposed, said housing comprises a first side surface and a second side surface, wherein said heat pump is configured to draw ambient air through one of said first side surface and said second side surface and expel air through the other one of said first side surface and said second side surface.

6. A heating system comprising:
   (a) a thermal battery;
   (b) a heat pump configured to store heat in said thermal battery;
   (c) a photovoltaic thermal system comprising a solar electric generator and a solar thermal generator, wherein said solar thermal generator is configured to store heat in said thermal battery and said solar electric generator is configured to generate electrical charge; and
   (d) a housing within which said thermal battery and said heat pump are disposed and atop which said photovoltaic thermal system is disposed; and
   (e) a resistive heater configured for generating supplemental heat to be stored in said thermal battery.

* * * * *